US010381028B2

(12) United States Patent  
Yamada (10) Patent No.: US 10,381,028 B2  
(45) Date of Patent: Aug. 13, 2019

(54) CIRCUIT MEMBER OF DISK DRIVE SUSPENSION

(71) Applicant: NHK SPRING CO., LTD., Yokohama-shi, Kanagawa (JP)

(72) Inventor: Yukie Yamada, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 16/150,934

(22) Filed: Oct. 3, 2018

(65) Prior Publication Data

US 2019/0108853 A1 Apr. 11, 2019

(30) Foreign Application Priority Data

Oct. 6, 2017 (JP) .................. 2017-195608

(51) Int. Cl.  
*G11B 5/48* (2006.01)

(52) U.S. Cl.  
CPC ............ *G11B 5/4853* (2013.01); *G11B 5/486* (2013.01); *G11B 5/4826* (2013.01); *G11B 5/4833* (2013.01); *G11B 5/4846* (2013.01)

(58) Field of Classification Search  
CPC ....... G11B 5/48; G11B 5/4853; G11B 5/4826; G11B 5/4833; G11B 5/486; G11B 5/4846  
USPC .............................................. 360/234–234.8  
See application file for complete search history.

(56) References Cited

U.S. PATENT DOCUMENTS

| 5,892,637 | A | 4/1999 | Brooks, Jr. et al. |
| 6,212,046 | B1 | 4/2001 | Albrecht et al. |
| 7,129,418 | B2 * | 10/2006 | Aonuma ................ H05K 3/243 174/255 |
| 2004/0245619 | A1 * | 12/2004 | Takeuchi .......... H01L 23/49827 257/688 |
| 2005/0122627 | A1 * | 6/2005 | Kanagawa ............. G11B 5/486 360/245.9 |
| 2012/0134047 | A1 * | 5/2012 | Kikuchi ............... G11B 5/4853 360/99.08 |
| 2015/0027752 | A1 * | 1/2015 | Takakura ............... H05K 1/118 174/251 |
| 2016/0012838 | A1 * | 1/2016 | Arai ..................... G11B 5/4846 360/245.9 |
| 2016/0012839 | A1 * | 1/2016 | Arai ..................... G11B 5/4826 360/245.9 |
| 2016/0071533 | A1 * | 3/2016 | Kawao .................. G11B 21/16 360/245.9 |

FOREIGN PATENT DOCUMENTS

| JP | H05182141 A | 7/1993 |
| JP | 2016015194 A | 1/2016 |

* cited by examiner

*Primary Examiner* — Allen T Cao  
(74) *Attorney, Agent, or Firm* — Holtz, Holtz & Volek PC (57) ABSTRACT

A circuit member includes a metal base, an insulating layer, a conductor, and a cover layer. A termial portion of the circuit member includes a thick portion formed at a part of the insulating layer, a conductor convex portion which is a part of the conductor, and overlaps the thick portion, and a conductor extending portion. By the conductor convex portion and the conductor extending portion, a stepped side pad is formed. The stepped side gad includes a first surface along the conductor extending portion, and a second surface which rises in a thickness direction of the conductor extending portion. The stepped side pad and an element are connected by a conductive member.

11 Claims, 7 Drawing Sheets

CIRCUIT MEMBER OF DISK DRIVE SUSPENSION

CROSS-REFERENCE TO RELATED APPLICATIONS

This application is based upon and claims the benefit of priority from prior Japanese Patent Application No. 2017-195608, filed Oct. 6, 2017, the entire contents of which are incorporated herein by reference.

BACKGROUND OF THE INVENTION

1. Field of the Invention

The present invention relates to a circuit member of a disk drive suspension, and more particularly, to a terminal portion to which an electronic component is connected.

2. Description of the Related Art

A hard disk drive (HDD) is used in an information processing apparatus, such as a personal computer. The hard disk drive comprises a magnetic disk rotatable about a spindle, carriage turnable about a pivot, etc. A disk drive suspension is provided on an arm of the carriage.

The disk drive suspension comprises elements such as a load beam, and a flexure disposed to overlap the load beam. A slider, which constitutes a magnetic head, is mounted on a tongue portion formed near a distal end of the flexure. The slider is provided with elements (transducers) for accessing data, that is, for reading or writing data. The suspension, the slider, etc., constitute a head gimbal assembly.

Various types of flexures have been put to practical use according to the required specifications. For example, a flexure with conductors includes a metal base, an insulating layer, a plurality of conductors, and a cover layer covering the conductors. The metal base is formed of a thin stainless steel plate. The insulating layer is formed of an electrically insulating material such as polyimide, and is formed on the metal base. The conductors are made of copper, and are formed on the insulating layer.

In accordance with a multifunction feature of the suspension, the number of conductors arranged at the flexure has been increased. As the means for connecting the conductors to terminals of an electronic component, bonding by ultrasonic induction heating, and bonding using solder are known. When the terminals are to be bonded to each other by solder, a method of bonding the terminals vertically is generally known. More specifically, a surface of one terminal is overlaid on a surface of another terminal in a thickness direction, and the two terminals are bonded to each other. On the other hand, connecting the terminals in a lateral direction of the conductors is also known. Connecting the terminals in the lateral direction has a problem in the reliability of connection because a sufficient connection area cannot be obtained due to the thinness of the conductors.

JP H05-182141 A (Patent Literature 1) and U.S. Pat. No. 5,892,637 A (Patent Literature 2) describe that a bent portion is formed at a distal end of a conductor, and the bent portion is connected to a terminal of an electronic component (a slider). JP 2016-15194 A (Patent Literature 3) describes that a bent portion formed at a distal end of a conductor is connected to a terminal of an electronic component (a heat assist element). U.S. Pat. No. 6,212,046 B1 (Patent Literature 4) describes that a conductive member (solder) is provided on a pad arranged on an insulating layer (polyimide).

In a connection portion described in Patent Literatures 1, 2, and 3, a bent portion is formed at an end portion of the conductor, and the bent portion is connected to the terminal. However, if the accuracy of the shape of the bent portion is not good, connection with an electronic component may become defective. Moreover, there is a problem that forming a bent portion at an end portion of a small conductor accurately is technically difficult, and is troublesome. In a circuit member described in Patent Literature 4, high-temperature molten solder supplied on a pad may contact polyimide, and in such a case, polyimide may be deteriorated by the heat of the solder. In a terminal portion where a plurality of pads are arranged on a plane, molten solder may be supplied to each of the pads. In that case, part of the solder may adhere to a portion between adjacent pads, which may become a cause of electric short-circuit (solder bridge).

BRIEF SUMMARY OF THE INVENTION

An object of the present invention is to provide a circuit member of a disk drive suspension comprising a stepped side pad capable of preventing a conductive member such as solder from contacting a cover layer.

One embodiment relates to a circuit member of a disk drive suspension comprising a metal base, an insulating layer, a conductor, a cover layer, and a terminal portion. The metal base is made of stainless steel, for example. The insulating layer is formed of an electrically insulating material such as polyimide, and is formed on the metal base. The conductor is formed on the insulating layer. The cover layer is formed of an electrically insulating material, and covers the conductor. The terminal portion comprises a thick portion, a conductor convex portion, a conductor extending portion, and a stepped side pad. The thick portion is a part of the insulating layer. The conductor convex portion is a part of the conductor, and overlaps the thick portion. The conductor extending portion extends toward an edge of the insulating layer from the conductor convex portion. The stepped side pad includes a first surface and a second surface. The first surface extends in a direction along the conductor extending portion. The second surface rises in a thickness direction of the conductor extending portion along a side surface of the conductor convex portion from the first surface.

The circuit member of the present embodiment includes the stepped side pad, and can be connected with an electronic component via the stepped side pad. It is possible to prevent a conductive member such as solder from contacting the cover layer by the stepped side pad. The electronic component can be supported at a predetermined position by the first surface or the second surface of the stepped side pad.

The above embodiment may comprise an opening formed in the cover layer, and an upper surface pad formed on the conductor convex portion within the opening. Also, the first surface of the stepped side pad may include a positioning portion which supports the electronic component. Further, by a structure in which an edge of the insulating layer is located on the inner side relative to an edge of the conductor extending portion, and an edge of the metal base is located on the inner side relative to the edge of the insulating layer, a conductor extending portion may be provided on an end portion of the insulating layer. By a structure in which the edge of the insulating layer is extended more to the outer side than the edge of the conductor extending portion, and the edge of the metal base is extended more to the outer side than the edge of the insulating layer, a metal base extension portion which supports the edge of the insulating layer and the edge of the conductor extending portion may be provided.

The embodiment may comprise a cover member which is formed of an electrically insulating material, and overlaps the conductor extending portion in a thickness direction of the conductor extending portion, and the first surface which supports the electronic component may be formed on the cover member. In the embodiment, the thick portion may include step portions whose heights are reduced stepwise toward the edge of the insulating layer, and the stepped side pact may be formed along these step portions. Also, the embodiment may comprise a third surface along the conductor convex portion between the second surface of the stepped side pad and an edge of the cover layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A circuit member of a disk drive suspension according to a first embodiment will now be described with reference to FIGS. 1 to 5.

Figure 1:
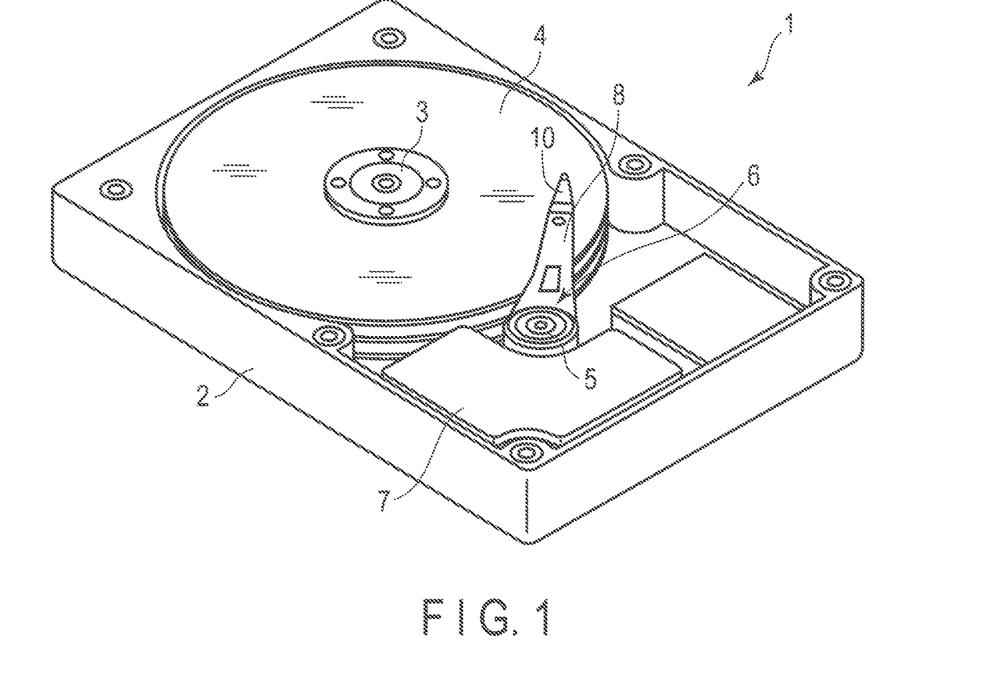
FIG. 1 is a perspective view showing an example of a disk drive.

A disk drive (HDD) 1 shown in FIG. 1 comprises a case 2, disks 4 rotatable about a spindle 3, a carriage 6 which turns about a pivot 5, and a positioning motor 7 for turning the carriage 6. The case 2 is sealed by a lid.

Figure 2:
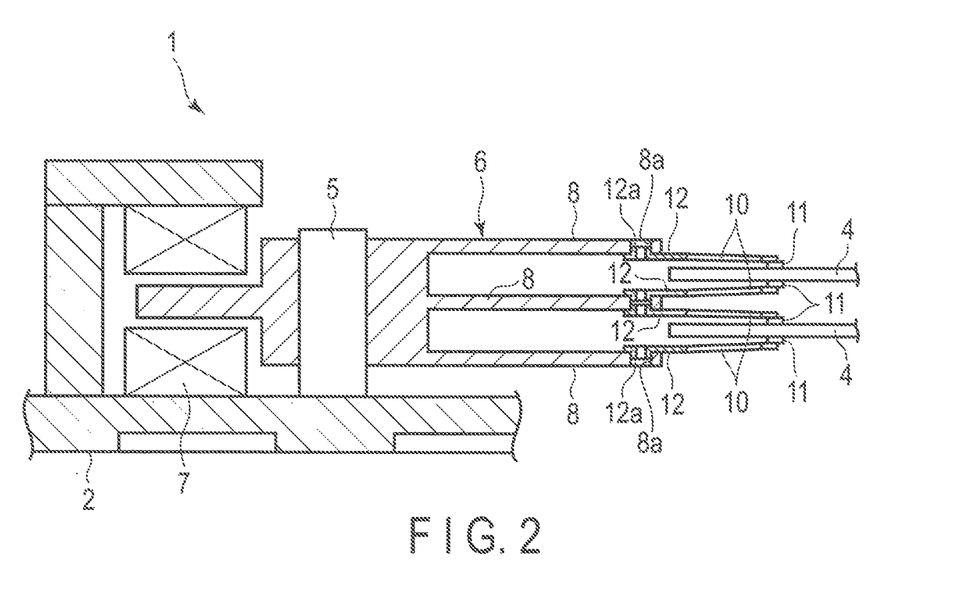
FIG. 2 is a cross-sectional view of a part of the disk drive shown in FIG. 1.

FIG. 2 is a cross-sectional view schematically showing a part of the disk drive 1. The carriage 6 is provided with arms 8. At a distal end portion of each arm 8, a disk drive suspension (hereinafter simply referred to as a suspension) 10 is mounted. A slider 11 which constitutes a magnetic head is provided at a distal end portion of the suspension 10.

As each disk 4 rotates at high speed, an air bearing is formed between a recording surface of the disk 4 and the slider 11. If the carriage 6 is turned by the positioning motor 7, the suspension 10 moves radially relative to the recording surface of the disk 4. In this way, the slider 11 moves to a desired track of the recording surface. The suspension 10 and the slider 11 constitute an HGA (head gimbal assembly).

Figure 3:
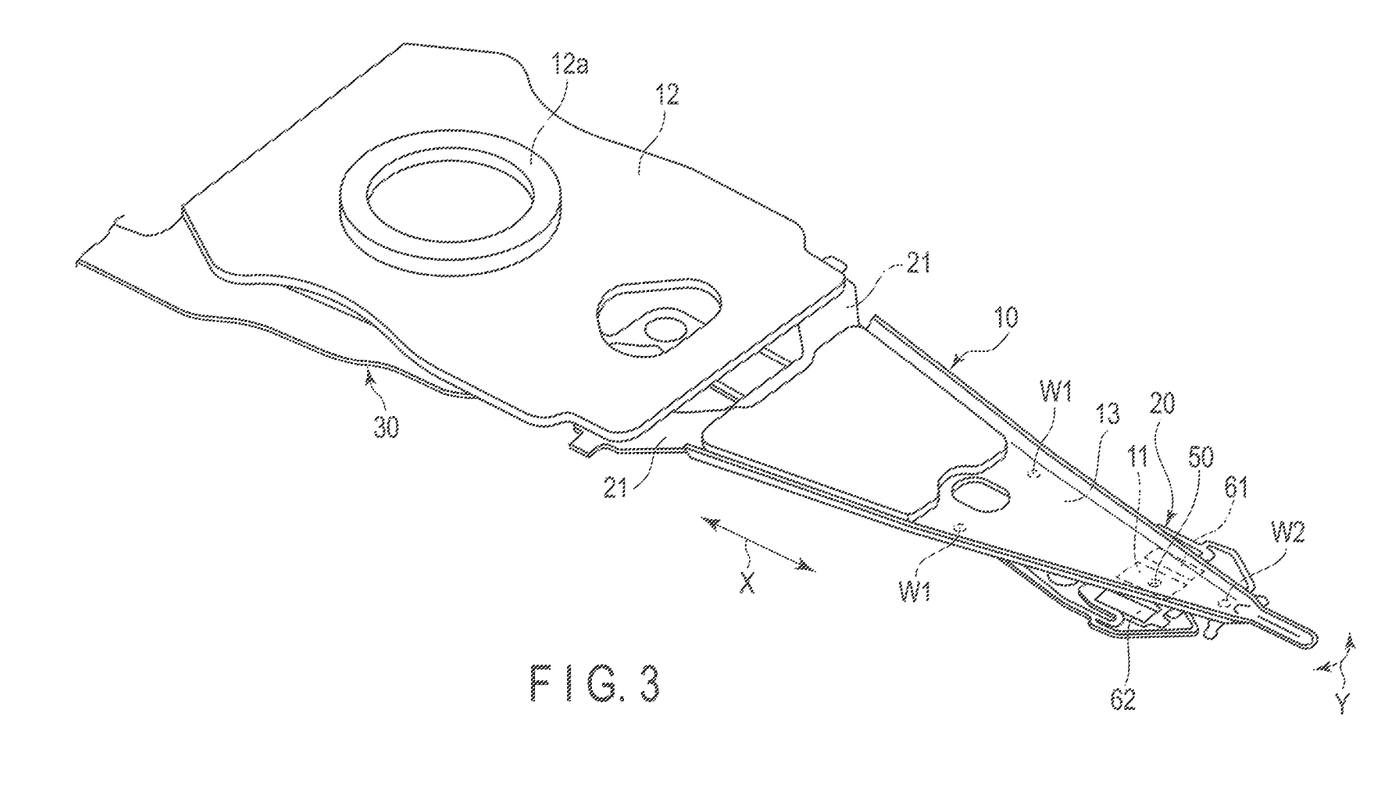
FIG. 3 is a perspective view showing an example of a suspension of the disk drive.

FIG. 3 shows a dual-stage-actuator-type suspension 10. The suspension 10 includes a baseplate 12 fixed to the arm 8, a load beam 13, and a flexure 20. A boss portion 12a is formed on the baseplate 20. The boss portion 12a is inserted into a hole 8a (FIG. 2) of each arm 8.

A direction indicated by arrow X in FIG. 3 is a longitudinal direction (front-rear direction) of the suspension 10. Arrow Y indicates a sway direction (i.e., a width direction of the slider 11). A spring portion 21 is formed at a proximal portion of the load beam 13. The spring portion 21 can be deformed elastically in a thickness direction. The flexure 20 is arranged along the load beam 13.

Figure 4:
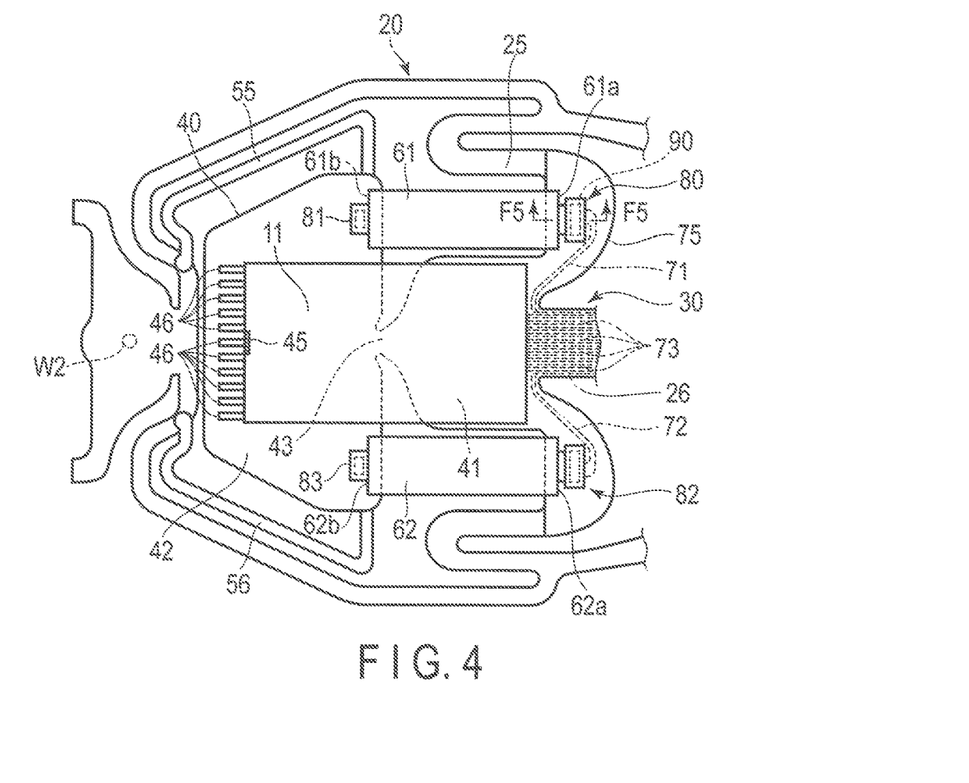
FIG. 4 is a plan view showing a part of the suspension comprising a circuit member of a first embodiment.
Figure 5:
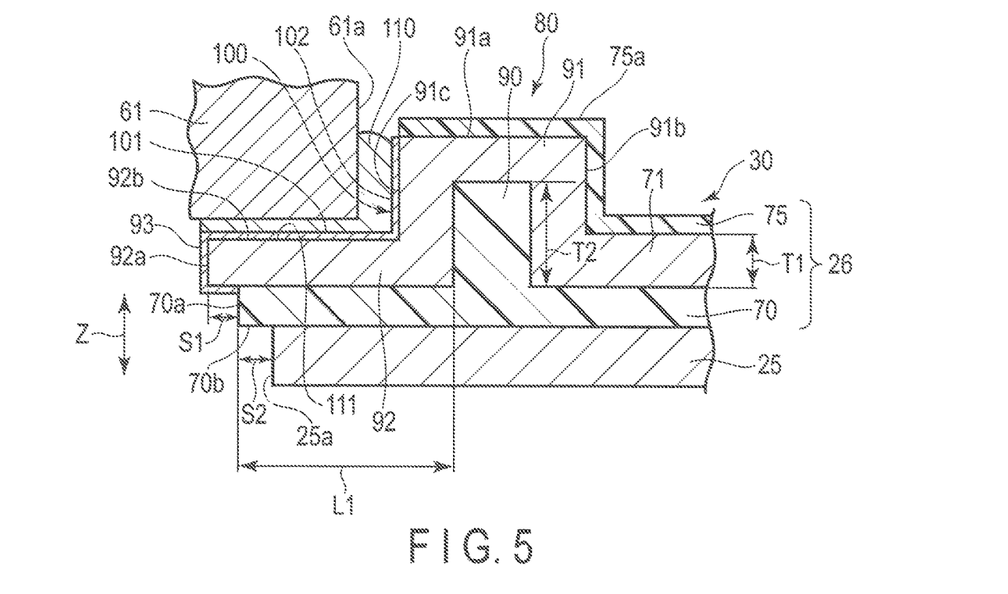
FIG. 5 is a cross-sectional view of a terminal portion of a circuit member taken along line F5-F5 of FIG. 4.

FIG. 4 is a plan view of a distal end portion of the flexure 20 when seen from the side of the slider 11. FIG. 5 is a sectional view taken along line F5-F5 of FIG. 4. The flexure 20 includes a metal base 25 formed of a stainless-steel plate, and a printed circuit portion 26. The printed circuit portion 26 is arranged along the metal base 25. A thickness of the metal base 25 is less than a thickness of the load beam 13. In one example, the thickness of the metal base 25 is 20 μm (12 to 25 μm). The metal base 25 is secured to the load beam 13 by welds W1 and W2 (FIGS. 3 and 4). By the metal base 25 and the printed circuit portion 26, a circuit member 30 is constituted.

A tongue 40 is formed at a distal end portion of the flexure 20. The tongue 40 includes a first tongue portion 41, a second tongue portion 42, and a hinge portion 43. The first tongue portion 41 and the second tongue portion 42 are connected to each other by the hinge portion 43. The slider 11 is fixed on the second tongue portion 42. At a distal end of the slider 11, an element 45 for recording/reproduction (schematically illustrated in FIG. 4), such as an MR element, is provided. Terminals 46 for the slider 11 are provided on the second tongue portion 42.

As shown in FIG. 3, a dimple 50 is formed near a distal end of the load beam 13. A distal end of the dimple 50 on a convex side is in contact with the hinge portion 43 of the tongue 40. The tongue 40 can swing in a rolling direction, a pitching direction, and the like, with the dimple 50 being a fulcrum.

As shown in FIG. 4, each of limiter members 55 and 56 is provided between the distal end portion of the flexure 20 and the second tongue portion 42. The limiter members 55 and 56 prevent the tongue 40 from being swung excessively, or the tongue 40 from moving away from the dimple 50 when mechanical impact is applied to the suspension 10 externally.

Elements 61 and 62 as an example of an electronic component are arranged on both sides of the slider 11. Each of the elements 61 and 62 includes an element body made of PZT (lead zirconate titanate), and a first electrode and a second electrode provided on the element body. First end portions 61a and 62a of the elements 61 and 62 are fixed to the first tongue portion 41. Second end portions 61b and 62b of the elements 61 and 62 are fixed to the second tongue portion 42. The elements 61 and 62 each function as a microactuator.

As shown in FIG. 5, the circuit member 30 includes the metal base 25 of the flexure 20, and the printed circuit portion 26. The printed circuit portion 26 is arranged along the metal base 25. The printed circuit portion 26 includes an insulating layer 70, a plurality of conductors 71, 72, and 73 (FIG. 4), and a cover layer 75. The insulating layer 70 is formed on the metal base 25. The conductors 71, 72, and 73 are formed on the insulating layer 70. The cover layer 75 covers the conductors 71, 72, and 73. The insulating layer 70 and the cover layer 75 are made of an electrically insulating material (for example, polyimide).

As shown in FIG. a first conductor 71 is electrically connected to the first end portion 61a of the element 61 via a terminal portion 80. The second end portion 61b of the element 61 is grounded to the metal base 25 via a conductive member 81. A second conductor 72 is electrically connected to the first end portion 62a of the element 62 via a terminal portion 82. The second end portion 62b of the element 62 is grounded to the metal base 25 via a conductive member 83. The conductors 73 for the slider 11 are connected to the terminals 46 for the slider 11, respectively.

FIG. 5 schematically represents the end portion 61a of one of the two elements, i.e., the element 61, and a cross section of the terminal portion 80 of the circuit member 30. The terminal portion 82 to which the other element 62 (FIG. 4) is connected has a structure similar to the one shown in FIG. 5. For this reason, the terminal portion 80, which is one of the two terminal portions, will be hereinafter explained as a typical example of the terminal portion.

Arrow Z in FIG. 5 indicates a thickness direction of the circuit member 30 (i.e., a thickness direction of the conductor 7). The conductor 71 is made of copper, and is formed along the insulating layer (base polyimide) 70. A thickness T1 (FIG. 5) of the conductor 71 is, for example, 10 μm. The other conductors 72 and 73 (FIG. 4) are also formed along the insulating layer 70.

As shown in FIG. 5, the terminal portion 30 includes a thick portion 90, a conductor convex portion 91, and a conductor extending portion 92. The thick portion 90 is a part of the insulating layer 70, and a thickness of the thick portion 90 near an end portion of the insulating layer 70 is greater than a thickness of the other parts by T2. The thick portion 90 is formed at a point inward from an edge 70a of the insulating layer 70 by a distance L1. The conductor convex portion 91 is a part of the conductor 71, and covers the thick portion 90. Accordingly, the conductor convex portion 91 has a convex shape protruding in a thickness direction of the insulating layer 70. The conductor extending portion 92 extends along the insulating layer 70 from the conductor convex portion 91 toward the edge 70a of the insulating layer 70.

As shown in FIG. 5, the edge 70a of the insulating layer 70 is at a position retracted to the inner side by a length S1 as compared to an edge 92a of the metal base 25 is at a position retracted to the inner side by a length S2 as compared to the edge 70a of the insulating layer 70. Thus, an insulating layer extending portion 70b is formed at an end portion of the insulating layer 70. By the insulating layer extending portion 70b, an electrical insulating portion is secured between the edge 92a of the conductor extending portion 92 and the edge 25a of the metal base 25.

An upper surface 91a and a rear surface 91b of the conductor convex portion 91 are covered with an extension portion 75a of the cover layer 75. A side surface 91c of the conductor convex portion 91 and the conductor extending portion 92 are covered with a gold-plating layer 93. By the gold-plating layer 93, in addition to preventing oxidization of the conductor extending portion 92, the electrical resistance can be reduced.

The side surface 91c of the conductor convex portion 91 extends in the thickness direction of the conductor 71. In contrast, an upper surface 92b of the conductor extending portion 92 extends in a longitudinal direction of the conductor 71. By the conductor convex portion 91 and the conductor extending portion 92, a stepped side pad 100 is formed. The stepped side pad 100 includes a first surface 101 extending in a direction along the conductor extending portion 92, and a second surface 102 which rises in a thickness direction of the conductor extending portion 92 from the first surface 101.

An electronic component (for example, the element 61) is electrically connected to the stepped side pad 100 via a conductive member 110. An example of the conductive member 110 is soft solder (solder) supplied to a part between the stepped side pad 100 and the element 61. An electronic component other than the element 61 may be connected to the stepped side pad 100. The conductor 71 and the electronic component (element 61) are fixed to each other, and are electrically connected to each other by the conductive member 110.

As shown in FIG. 5, the stepped side pad 100 includes the first surface 101 and the second surface 102. The first surface 101 extends in a longitudinal direction of the conductor extending portion 92. The second surface 102 extends in the thickness direction of the conductor extending portion 92 along the side surface 91c of the conductor convex portion 91. Accordingly, the stepped side pad 100 has a connection surface which is large enough to be connected with the electronic component (element 61). Moreover, by the first surface 101 and the second surface 102 of the stepped side pad 100, the electronic component (element 61) can be fixed stably in an accurate position. The first surface 101 includes a positioning portion 111 for supporting the element 61.

In connecting the element 61 to the terminal portion 80, the conductive member 110 such as molten solder is supplied to a part between the element 61 and the terminal portion 80. Movement of the conductive member 110 toward the cover layer (polyimide) 75 can be suppressed by the stepped side pad 100 including the second surface 102. Accordingly, it is possible to prevent a high-temperature conductive member 110 from contacting the cover layer 75, thereby preventing deterioration of the cover layer 75 due to heat.

As the element 61 made of lead zirconate titanate (PZT) extends and contracts when a voltage is applied, it functions as a microactuator. Thus, a compressive or tensile load is applied to the end portion 61a of the element 61 when the element 61 is actuated. The end portion 61a of the element 61 of the present embodiment is supported by the thick portion 90 and the conductor convex portion 91 which constitute the stepped side pad 100. Accordingly, the end portion 61a can be firmly and reliably supported despite a load produced when the element 61 is actuated by a voltage.

An operation of the suspension 10 of the present embodiment will now be described.

If the carriage 6 (FIGS. 1 and 2) is turned by the positioning motor 7, the suspension 10 moves radially relative to the disk 4. In this way, the slider 11 moves to a desired track of the recording surface of the disk 4. When a voltage is applied to the elements 61 and 62, the elements 61 and 62 are deformed in directions opposite to each other according to the voltage. Consequently, the second tongue portion 42 slightly moves in the sway direction (i.e., the direction indicated by arrow Y in FIG. 3) with the hinge portion 43 being the center of rotation. Accordingly, the slider 11 can be positioned quickly and accurately in the sway direction.

Figure 6:
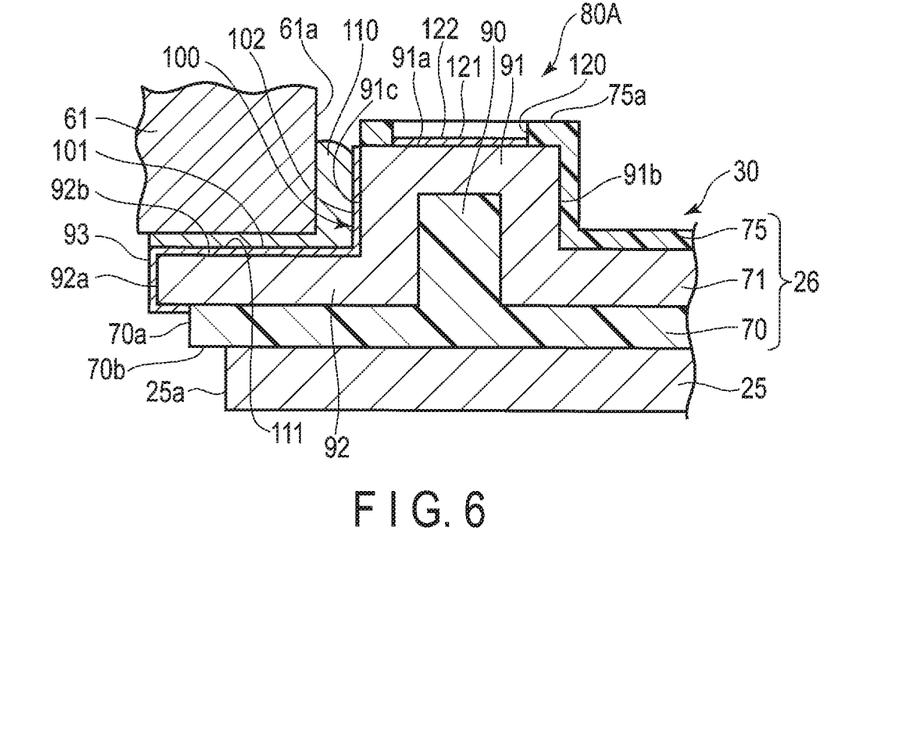
FIG. 6 is a cross-sectional view of a terminal portion of a circuit member according to a second embodiment.

FIG. 6 shows a terminal portion 80A according to a second embodiment. The terminal portion 80A includes an opening 120 formed in an extension portion 75a of a cover layer 75, and an upper surface pad 122. The opening 120 is provided at a position corresponding to a conductor convex portion 91. The upper surface pad 122 is formed within the opening 120, and on a conductor convex portion 91. The upper surface pad 122 is covered with a gold-plating layer 121. The upper surface pad 122 is electrically connected to a conductor 71. With the terminal portion 80A of the present embodiment, an electronic component (for example, an element 61) may be connected to a side pad 100, or the electronic component may be connected to the upper surface pad 122. Since the other structures of the terminal portion 80A have commonality with the terminal portion 80 shown in FIG. 5, common reference numbers are assigned to parts that are common to the two and explanations of such parts will be omitted.

Figure 7:
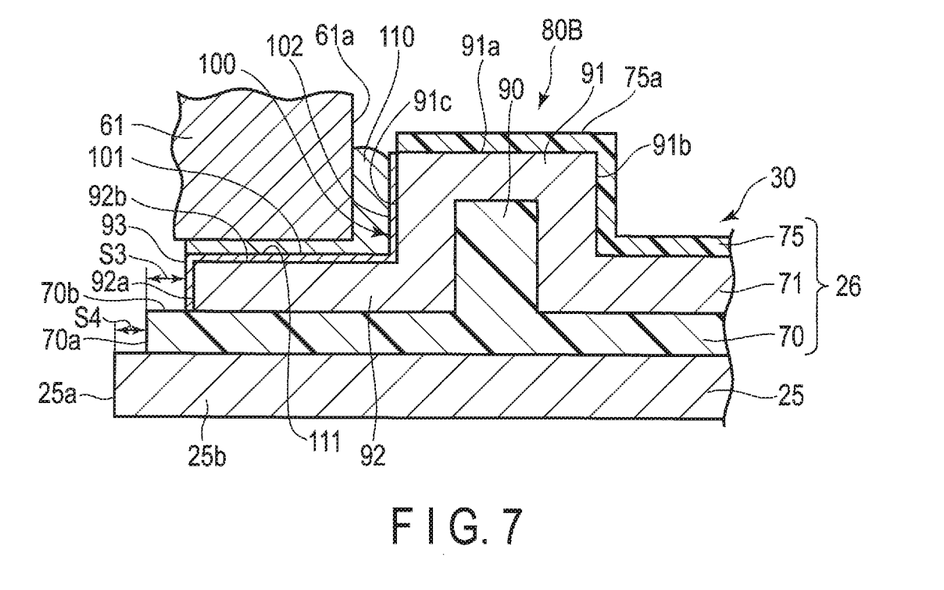
FIG. 7 is a cross-sectional view of a terminal portion of a circuit member according to a third embodiment.

FIG. 7 illustrates a terminal portion 80B according to a third embodiment. The terminal portion 80B includes an insulating layer extending portion 70b at an end portion of an insulating layer 70. The insulating layer extending portion 70b is formed at the end portion of the insulating layer 70 by extending an edge 70a of the insulating layer 70 more to the outer side than an edge 92a of a conductor extending portion 92 by a length S3. Further, the terminal portion 80B includes a metal base extension portion 25b at an end portion of a metal base 25. The metal base extension portion 25b is formed at the end portion of the metal base 25 by extending an edge 25a of the metal base 25 more to the outer side than the edge 70a of the insulating layer 70 by a length S4. By the metal base extension portion 25b, the edge 70a of the insulating layer 70 and the edge 92a of the conductor extending portion 92 are supported, and are not easily deformed in a thickness direction. Since the other structures of the terminal portion 80B have commonality with the terminal portion 80 shown in FIG. 5, common reference numbers are assigned to parts that are common to the two and explanations of such parts will be omitted.

Figure 8:
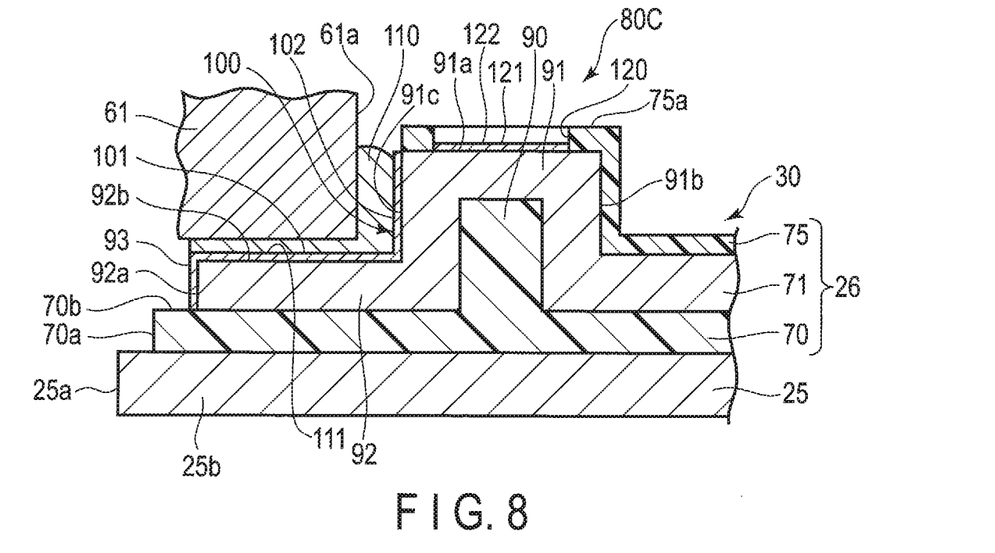
FIG. 8 is a cross-sectional view of a terminal portion of a circuit member according to a fourth embodiment.

FIG. 8 illustrates a terminal portion 80C according to a fourth embodiment. The terminal portion 80O includes an opening 120 formed in an extension portion 75a of a cover layer 75, and an upper surface pad 122. The opening 120 is provided at a position corresponding to a conductor convex portion 91. The upper surface pad 122 is formed within the opening 120, and on a conductor convex portion 91. The upper surface pad 122 is covered with a gold-plating layer 121. The upper surface pad 122 is electrically connected to a conductor 71. With the terminal portion 80C of the present embodiment, an electronic component (for example, an element 61) may be connected to a side pad 100, or the electronic component may be connected to the upper surface pad 122. Since the other structures of the terminal portion 80C have commonality with the terminal portion 80B shown in FIG. 7, common reference numbers are assigned to parts that are common to the two and explanations of such parts will be omitted.

Figure 9:
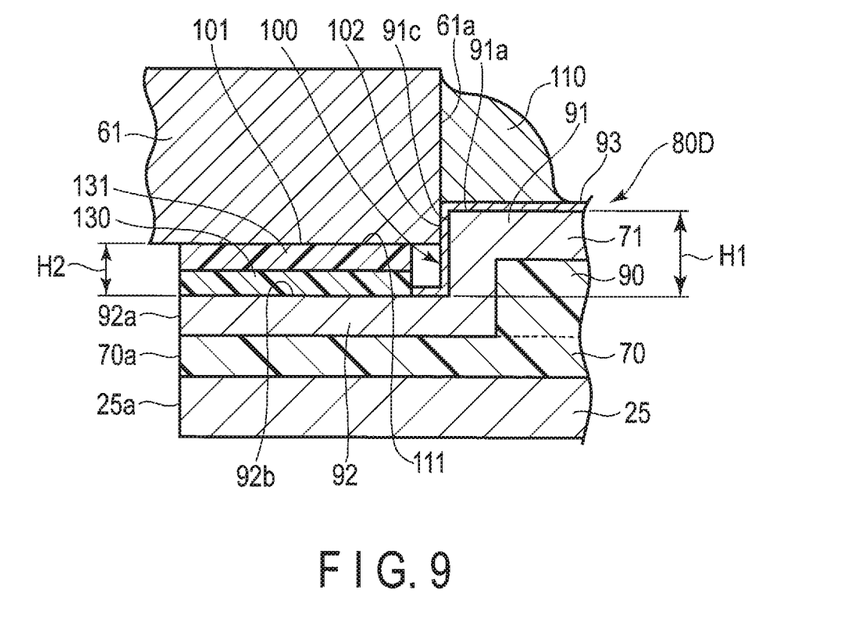
FIG. 9 is a cross-sectional view of a terminal portion of a circuit member according to a fifth embodiment.

FIG. 9 illustrates a terminal portion 80D according to a fifth embodiment. The terminal portion 80D includes a first cover member 130 and a second cover member 131. The first cover member 130 and the second cover member 131 are each formed of an electrically insulating material such as polyimide, and overlap one another in a thickness direction. The first cover member 130 overlaps an upper surface of a conductor extending portion 92. The second cover member 131 overlaps an upper surface of the first cover member 130. A height H1 of a conductor convex portion 91 is greater than a height H2 obtained by adding heights of the first cover member 130 and the second cover member 131. By the conductor convex portion 91 and the conductor extending portion 92, a stepped side pad 100 is formed. The stepped side pad 100 includes a first surface 101 and a second surface 102. The first surface 101 extends in a longitudinal direction of the conductor extending portion 92. The second surface 102 rises in a thickness direction of the conductor extending portion 92 from the first surface 101. The first surface 101 is formed on the second cover member 131. The first surface 101 includes a positioning portion 111 for supporting an electronic component (for example, an element 61). The second surface 102 is along a side surface 91c of the conductor convex portion 91.

As shown in FIG. 9, by the positioning portion 111 of the second cover member 131, the electronic component (for example, the element 61) is supported at a predetermined position. The element 61 and the conductor 71 are electrically connected to each other via a conductive member 110. In accordance with the height H2 obtained by adding the heights of the first cover member 130 and the second cover member 131, the height at which the element 61 is to be supported can be adjusted. The second cover member 131 arranged on the first cover member 130 includes the positioning portion 111 for supporting the element 61 at a predetermined height. Since the other structures of the terminal portion 80D have commonality with the terminal portion 80 shown in FIG. 5, common reference numbers are assigned to parts that are common to the two and explanations of such parts will be omitted.

Figure 10:
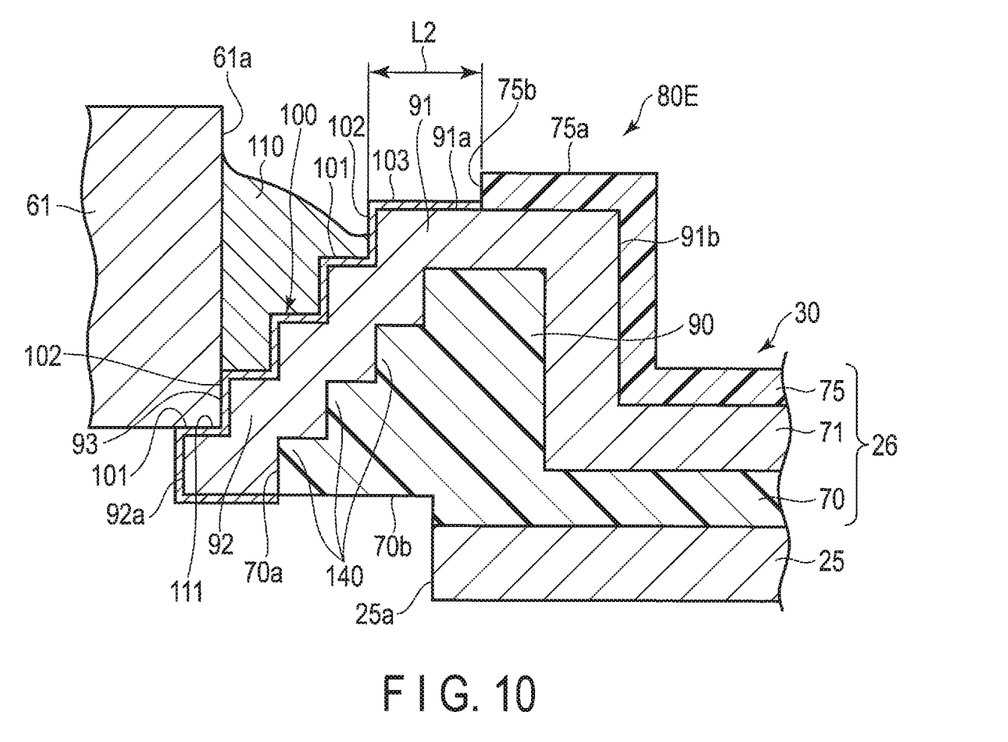
FIG. 10 is a cross-sectional view of a terminal portion of a circuit member according to a sixth embodiment.

FIG. 10 illustrates a terminal portion 80E according to a sixth embodiment. The terminal portion 80E includes a thick portion 90 formed in a stepwise configuration on a side portion of an insulating layer 70. The thick portion 90 includes a plurality of step portions 140 whose heights are gradually reduced toward an edge 70a of an insulating layer 70. A stepped side pad 100 having a stepwise configuration is formed on a conductor extending portion 92 along these step portions 140. The stepped side pad 100 includes a first surface 101 and a second surface 102 in each of the steps. A third surface 103 having a length L2 is formed along an upper surface 91a of a conductor convex Portion 91.

In the terminal portion 80E of the present embodiment, an electronic component (for example, an element 61) is supported by the first surface 101 and the second surface 102 of any of the steps of the stepped side pad 100. That is, the first surfaces 101 at heights different from each other include positioning portions 111, respectively. The element 61 and the side pad 100 are connected to each tether by a conductive member (solder) 110. By the terminal portion 80E comprising such a stepped side pad 100, an area of contact between the side pad 100 and the conductive member 110, and the bonding strength can be increased. Since the other structures of the terminal portion 80E have commonality with the terminal portion 80 shown in FIG. 5, common reference numbers are assigned to parts that are common to the two and explanations of such parts will be omitted.

Figure 11:
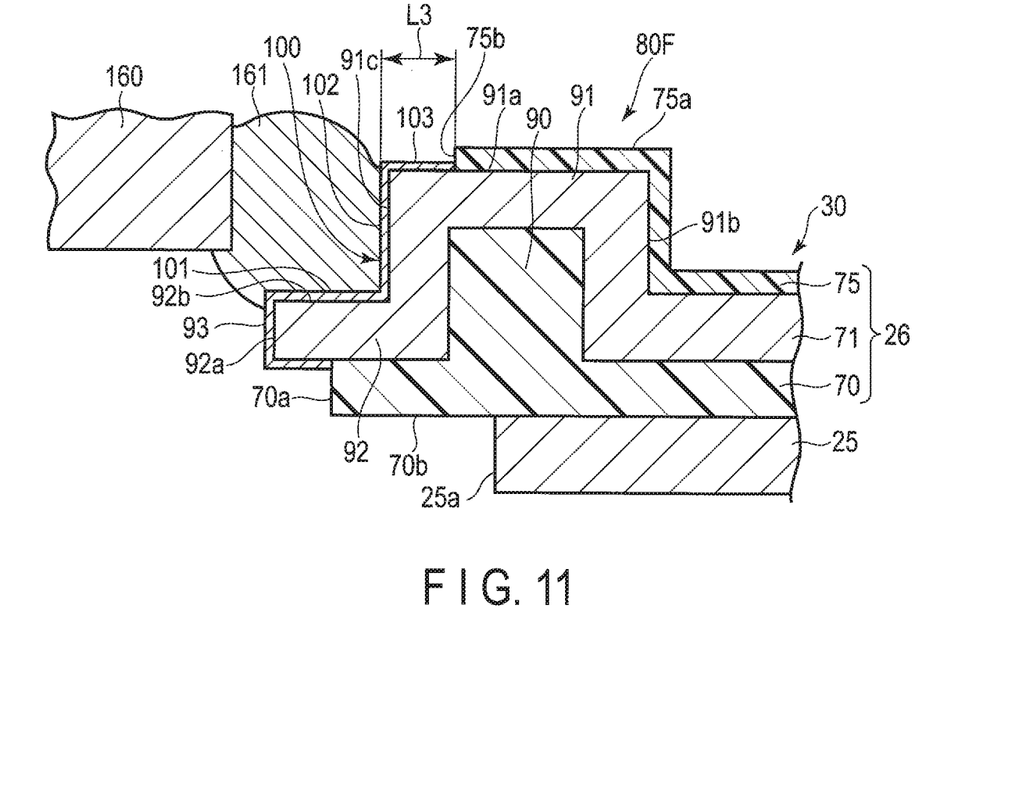
FIG. 11 is a cross-sectional view of a terminal portion of a circuit member according to a seventh embodiment.

FIG. 11 illustrates a terminal portion 80F according to a seventh embodiment. In the terminal portion 80F, a stepped side pad 100 and an electronic component 160 are connected via a conductive member 161. An example of the conductive member 161 is a solder ball. The stepped side pad 100 provided in the terminal portion 80F includes a first surface 101, a second surface 102, and a third surface 103. The first surface 101 extends along a conductor extending portion 92. The second surface 102 rises in a thickness direction of the conductor extending portion 92 from the first surface 101. The third surface 103 is formed between the second surface 102 and an edge 75b of a cover layer 75 along an upper surface 91a of a conductor convex portion 91.

When a molten, high-temperature conductive member 110 is supplied to the terminal portion 80F, the second surface 102 and the third surface 103 can prevent the conductive member 110 from moving toward the edge 75b of the cover layer 75. Accordingly, it is possible to prevent the high-temperature conductive member 110 from contacting the cover layer 75, and deterioration of the cover layer 75 by heat can be prevented. Since the other structures of the terminal portion 80F have commonality with the terminal portion 80 shown in FIG. 5, common reference numbers are assigned to parts that are common to the two and explanations of such parts will be omitted.

Figure 12:
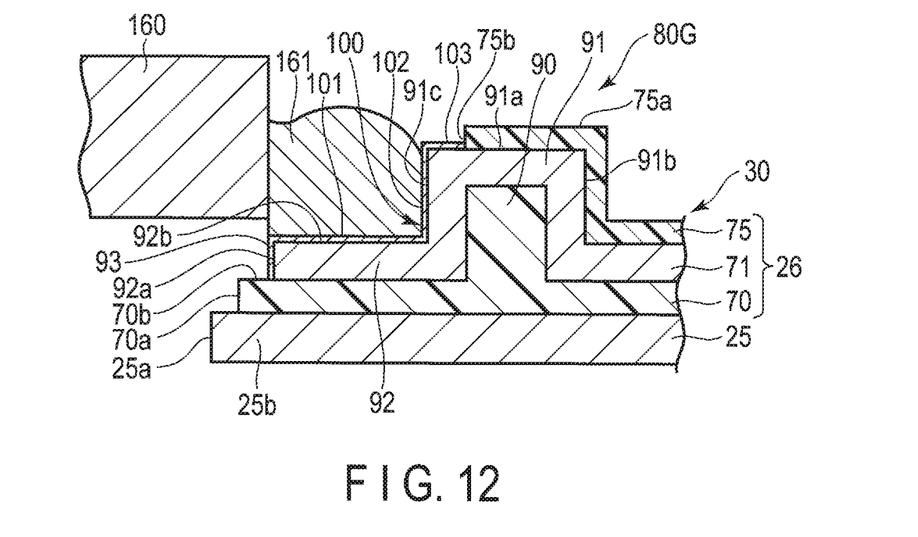
FIG. 12 is a cross-sectional view of a terminal portion of a circuit member according to an eighth embodiment.

FIG. 12 illustrates a terminal portion 80G according to an eighth embodiment. A stepped side pad 100 formed in the terminal portion 80G includes a first surface 101, a second surface 102, and a third surface 103. The first surface 101 extends along a conductor extending portion 92. The second surface 102 rises in a thickness direction of the conductor extending portion 92 from the first surface 101. The third surface 103 is along an upper surface 91a of a conductor convex portion 91. An edge 70a of an insulating layer 70 is extended more to the outer side than an edge 92a of the conductor extending portion 92. Thereby, an insulating layer extending portion 70b is formed. An edge 25a of a metal base 25 is extended more to the outer side than the edge 70a of the insulating layer 70. Thereby, a metal base extension portion 25b is formed at an end portion of the metal base 25. By the metal base extension portion 25b, the edge 70a of the insulating layer 70 and the edge 92a of the conductor extending portion 92 are supported, and are not easily deformed in a thickness direction. Since the other structures of the terminal portion 80G have commonality with the terminal portion 80F shown in FIG. 11, common reference numbers are assigned to parts that are common to the two and explanations of such parts will be omitted.

In carrying out the present invention, as well as the specific structure of the suspension. The shapes and arrangement of the thick portion of the insulating layer, the conductor convex portion, the conductor extending portion, the cover layer, the stepped side pad, and the like, which constitute the terminal portion of the circuit member may be modified variously as needed, as a matter of course. Also, an electronic component to be connected to the terminal portion may be one other than a piezoelectric element explained in the above embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A circuit member of a disk drive suspension comprising:
   a metal base;
   an insulating layer formed on the metal base, the insulating layer being formed of an electrically insulating material;
   a conductor formed on the insulating layer;
   a cover layer covering the conductor, the cover layer being formed of an electrically insulating material; and
   a terminal portion, wherein
   the terminal portion comprises:
   a thick portion formed at a part of the insulating layer;
   a conductor convex portion which is a part of the conductor, and overlaps the thick portion;
   a conductor extending portion extending from the conductor convex portion toward an edge of the insulating layer; and
   a stepped side pad including a first surface extending in a direction along the conductor extending portion, and a second surface rising from the first surface in a thickness direction of the conductor extending portion along a side surface of the conductor convex portion.

2. The circuit member of claim 1, further comprising an opening which is formed in the cover layer, and is open at a position corresponding to the conductor convex portion, and an upper surface pad which is formed on the conductor convex portion within the opening.

3. The circuit member of claim 1, wherein the first surface of the stepped side pad includes a positioning portion which supports an electronic component.

4. The circuit member of claim 2, wherein the first surface of the stepped side pad includes positioning portion which supports an electronic component.

5. The circuit member of claim 1, wherein an edge of the insulating layer is located on an inner side relative to an edge of the conductor extending portion, an edge of the metal base is located on the inner side relative to the edge of the insulating layer, and the circuit member includes an insulating layer extending portion on an end portion of the insulating layer.

6. The circuit member of claim 2, wherein an edge of the insulating layer is located on an inner side relative to an edge of the conductor extending portion, an edge of the metal base is located on the inner side relative to the edge of the insulating layer, and the circuit member includes an insulating layer extending portion on an end portion or the insulating layer.

7. The circuit member of claim 1, wherein an edge of the insulating layer is extended more to an outer side than an edge of the conductor extending portion, an edge of the metal base is extended more to an outer side than the edge of the insulating layer, and the circuit member includes a metal base extension portion which supports the edge of the insulating layer and the edge of the conductor extending portion at an end portion of the metal base.

8. The circuit member of claim 2, wherein an edge of the insulating layer is extended more to an outer side than an edge of the conductor extending portion, an edge of the metal base is extended more to an outer side than the edge of the insulating layer, and the circuit member includes a metal base extension portion edge of the conductor extending portion at an end portion of the metal base.

9. The circuit member of claim 1, wherein the circuit member comprises: a cover member, which is formed of an electrically insulating material, and overlaps the conductor extending portion in a thickness direction of the conductor extending portion; and the first surface which supports an electronic component on the cover member.

10. The circuit member of claim 1, wherein the thick portion comprises step portions whose heights are reduced stepwise toward the edge of the insulating layer, and the circuit member comprises the stepped side pad having a stepwise configuration along the step portions.

11. The circuit member of claim 1, wherein the circuit member comprises a third surface along the conductor convex portion between the second surface of the stepped side pad and an edge of the cover layer.

* * * * *